United States Patent [19]

Wheeler

[11] 4,428,145
[45] Jan. 31, 1984

[54] SHRIMP BAIT CONTAINER

[76] Inventor: Robert Wheeler, 823A E. Gulf Blvd., Indian Rocks Beach, Fla. 33535

[21] Appl. No.: 291,317

[22] Filed: Aug. 10, 1981

[51] Int. Cl.³ ............. A01K 97/04; A01K 63/02; B65D 21/08
[52] U.S. Cl. ..................... 43/55; 137/575; 137/576; 137/577; 206/518; 206/519; 220/4 D
[58] Field of Search ............. 43/55, 56, 57; 119/15, 119/2; 137/573, 575, 576, 577; 206/518, 515, 519, 520, 503; 220/4 D

[56] References Cited

U.S. PATENT DOCUMENTS

| 1,244,704 | 10/1917 | Coburn | 137/575 |
|---|---|---|---|
| 1,485,517 | 3/1924 | Morris | 137/577 |
| 1,577,823 | 3/1926 | Dolle | 220/4 D |
| 2,686,383 | 8/1954 | Rubey | 43/55 |
| 2,826,333 | 3/1958 | Rodemich | 206/503 X |
| 2,949,691 | 8/1960 | Johnson | 43/55 |
| 3,961,603 | 6/1976 | Gaddie | 119/15 |
| 4,030,227 | 6/1977 | Oftedahl | 43/56 |

FOREIGN PATENT DOCUMENTS

| 1152572 | 8/1963 | Fed. Rep. of Germany | 119/2 |
|---|---|---|---|
| 2259561 | 6/1974 | Fed. Rep. of Germany | 206/518 |

Primary Examiner—Nicholas P. Godici
Assistant Examiner—Charles L. Willis
Attorney, Agent, or Firm—Stanley M. Miller

[57] ABSTRACT

A shrimp bait container is disclosed which includes a plurality of stacked trays, with each tray storing live shrimp bait in a water medium. Each tray is substantially a frusto-pyramidal shaped housing having four sides and a bottom, composed of a relatively thick, thermally insulating material. The sides extend upwardly and outwardly from the bottom and are inclined so that the outer surfaces thereof for an upper one of the trays will mate with the inner surfaces thereof for an adjacent, lower one of the trays, forming an enclosed volume for storing the water medium containing the shrimp bait. The bottom of each tray has a perforation therethrough. An adjustable water depth controlling pipe is slideably mounted in substantial vertical orientation in the perforation in the bottom of each housing, having a height above the bottom which can be vertically adjusted and through which water within the enclosed volume may overflow, thus defining the depth of the water. The shrimp bait contained in the water medium can thus be preserved alive in the thermally insulated environment. Overcrowding of the live shrimp can be avoided by selectively adjusting the depth of the water in each tray so as to be shallow enough to prevent the shrimp from smothering one another, consistent with their segregated size and species. The water in each respective stacked tray can be conveniently refreshed by introducing new water in the top tray, which will cascade through each successively lower tray.

9 Claims, 8 Drawing Figures

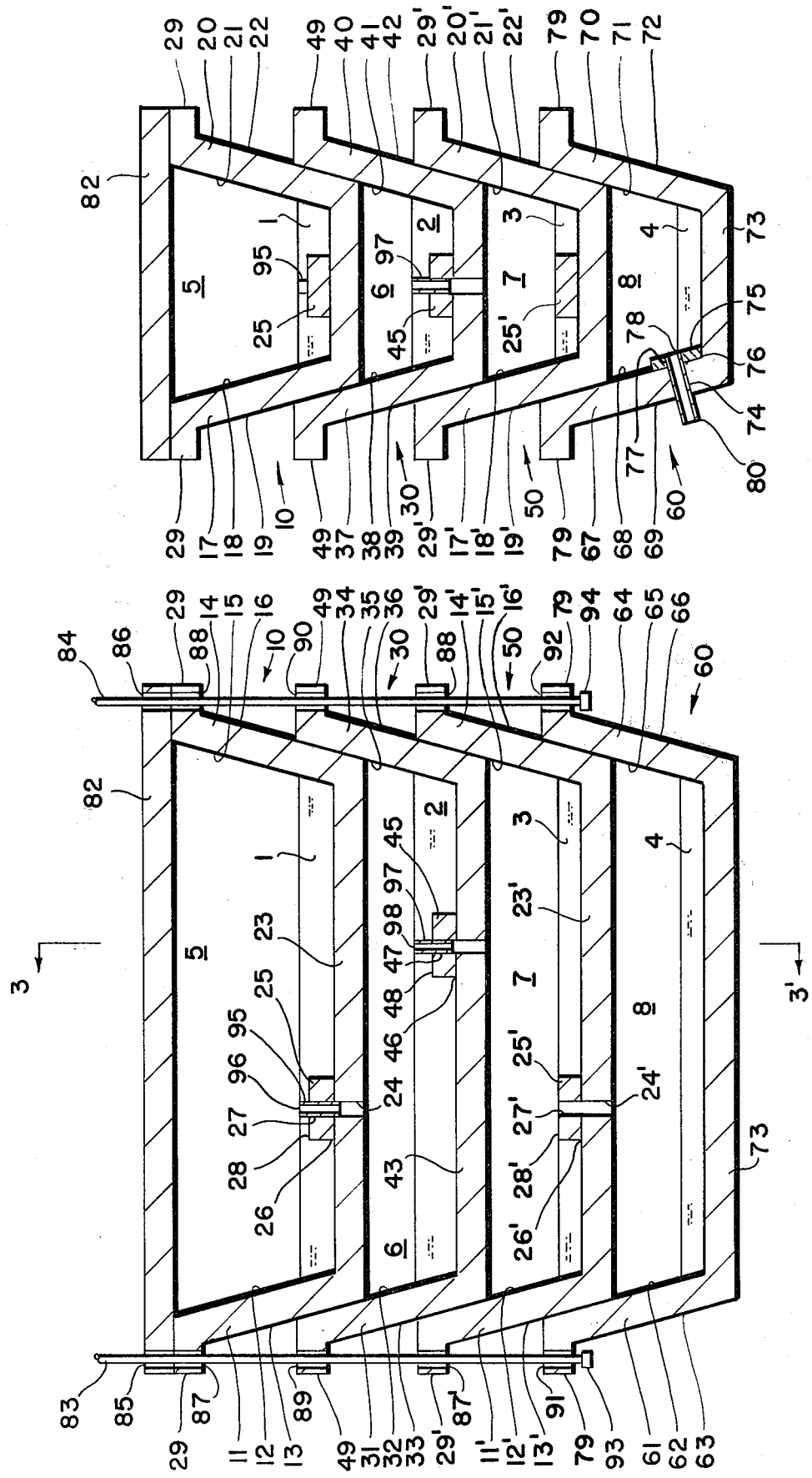

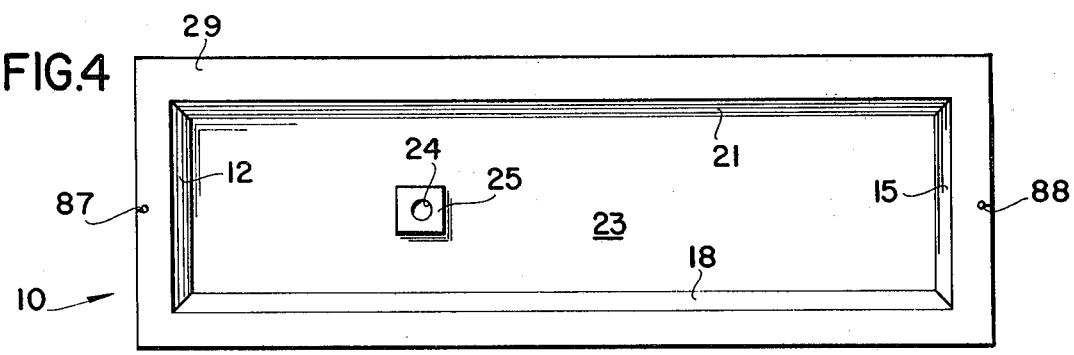
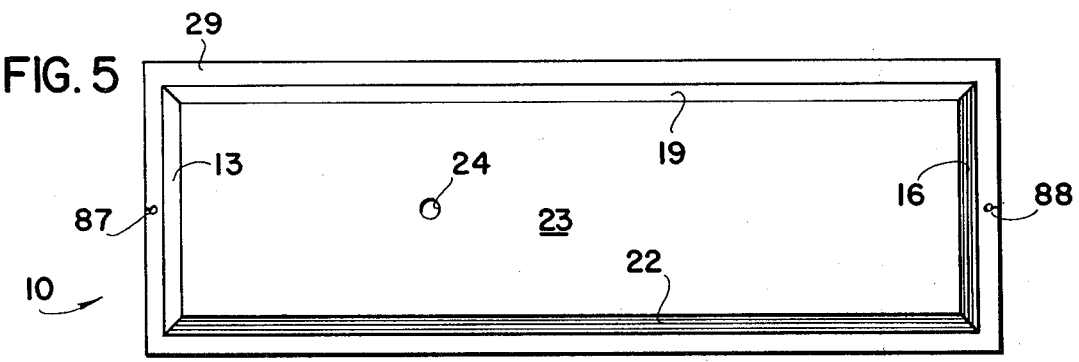
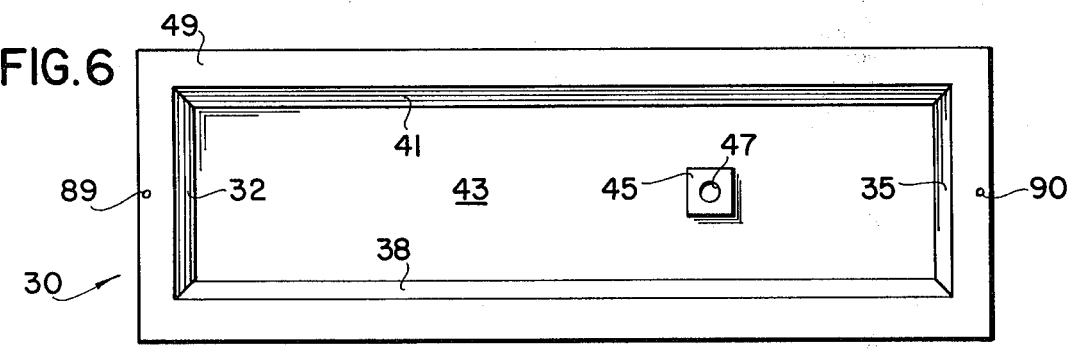
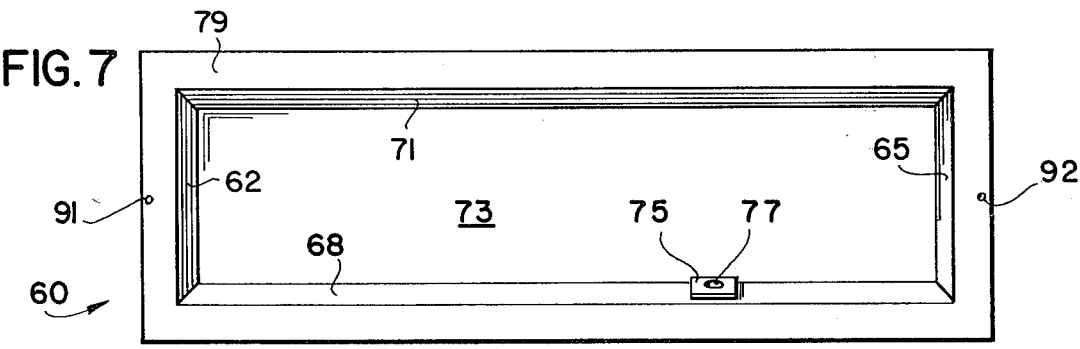

SHRIMP BAIT CONTAINER

FIELD OF THE INVENTION

The invention broadly relates to fishing accessories and more particularly relates to bait containers for live shrimp bait.

BACKGROUND OF THE INVENTION

Both sport and commercial fishermen have found that live shrimp, when used as bait in trolling or other forms of fishing, is an exceptionally effective way to attract fish. However, keeping the shrimp bait alive while onboard an open fishing boat during the fishing operation, has met with significant difficulties in the prior art. The shrimp is very susceptible to a water storage medium which is either too warm or too stale. In addition, shrimp tend to group together and overcrowd one another, which tends to reduce their survival rate. Furthermore, the species and size of the shrimp bait used for a particular fishing objective also varies so that is is desirable to somehow segregate the shrimp bait for the various possible types of fishing.

OBJECTS OF THE INVENTION

It is therefore an object of the invention to provide an improved means to store live shrimp bait.

It is still another object of the invention to provide an improved means to thermally insulate a live shrimp bait storage medium from high ambient temperatures.

It is yet a further object of the invention to provide a convenient means for refreshing the storage medium of live shrimp bait.

It is still a further object of the invention to provide a live shrimp bait storage medium which avoids the consequences of overcrowding.

It is still a further object of the invention an improved live shrimp bait storage means which enables the convenient segregation of the shrimp bait into various species and sizes.

SUMMARY OF THE INVENTION

These and other objects, features and advantages of the invention are accomplished by the shrimp bait container disclosed herein. A shrimp bait container is disclosed which includes a plurality of stacked trays, with each tray storing live shrimp bait in a water medium. Each tray is substantially a frusto-pyramidal shaped housing having four sides and a bottom, composed of a relatively thick, thermally insulating material. The sides extend upwardly and outwardly from the bottom and are inclined so that the outer surfaces thereof for an upper one of the trays will mate with the inner surfaces thereof for an adjacent, lower one of the trays, forming an enclosed volume for storing the water medium containing the shrimp bait. The bottom of each tray has a perforation therethrough. An adjustable water depth controlling pipe is slideably mounted in substantial vertical orientation in the perforation in the bottm of each housing, having a height above the bottom which can be vertically adjusted and through which water within the enclosed volume may overflow, thus defining the depth of the water. The shrimp bait contained in the water medium can thus be preserved alive in the thermally insulated environment. Overcrowding of the live shrimp can be avoided by selectively adjusting the depth of the water in each tray so as to be shallow enough to prevent the shrimp from smothering one another, consistent with their segregated size and species. The water in each respective stacked tray can be conveniently refreshed by introducing new water in the top tray, which will cascade through each successively lower tray.

DESCRIPTION OF THE FIGURES

These and other objects, features and advantages of the invention will be more fully appreciated with reference to the accompanying figures.

FIG. 2 is a front cross-sectional view along the section line 2-2' of FIG. 1.

FIG. 3 is a side cross-sectional view along section line 3-3' of FIG. 2.

FIG. 4 is a top view of the top tray 10.

FIG. 5 is a bottom view of the top tray 10.

FIG. 6 is a top view of the second tray 30.

FIG. 7 is a top view of the bottom tray 60.

DISCUSSION OF THE PREFERRED EMBODIMENT

A shrimp bait container is disclosed which includes a plurality of stacked trays, with each tray storing live shrimp bait in a water medium. Each tray is substantially a frusto-pyramidal shaped housing having four sides and a bottom, composed of a relatively thick, thermally insulating material. The sides extend upwardly and outwardly from the bottom and are inclined so that the outer surfaces thereof for an upper one of the trays will mate with the inner surfaces thereof for an adjacent, lower one of the trays, forming an enclosed volume for storing the water medium containing the shrimp bait. The bottom of each tray has a perforation therethrough. An adjustable water depth controlling pipe is slideably mounted in substantial vertical orientation in the perforation in the bottom of each housing, having a height above the bottom which can be vertically adjusted and through which water within the enclosed volume may overflow, thus defining the depth of the water. The shrimp bait contained in the water medium can thus be preserved alive in the thermally insulated environment. Overcrowing of the live shrimp can be avoided by selectively adjusting the depth of the water in each tray so as to be shallow enough to prevent the shrimp from smothering one another, consistent with their segregated size and species. The water in each respective stacked tray can be conveniently refreshed by introducing new water in the top tray, which will cascade through each successively lower tray.

Figure 1:
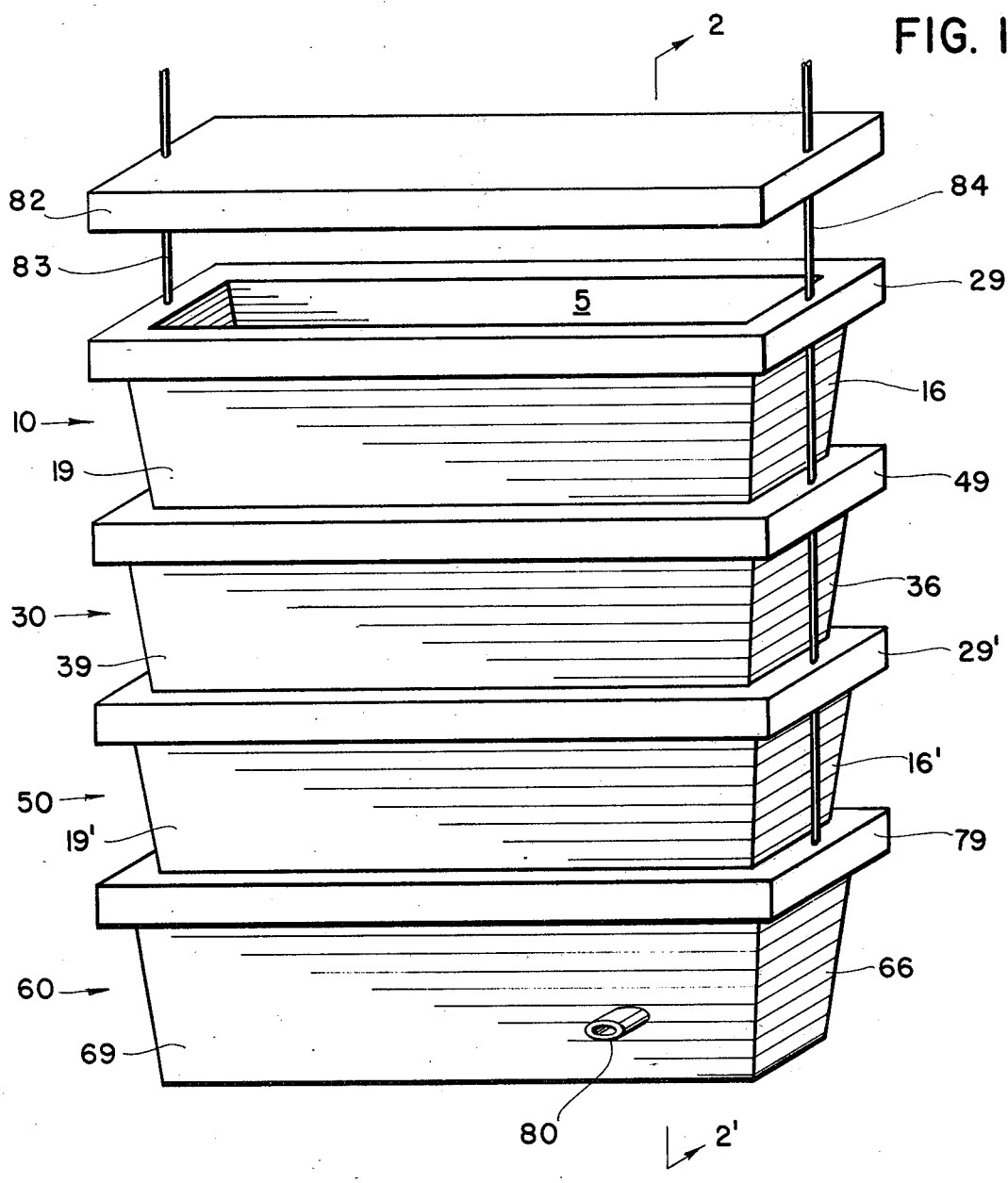
FIG. 1 is a three-dimensional overall view of the shrimp bait container.

FIG. 1 illustrates an overall three-dimensional view of the shrimp bait container which includes a pluarlity of stacked tray 10, 30, 50 and 60, with each tray storing live shrimp bait in a water medium. FIG. 2 is a front cross-sectional view along the section line 2-2' of FIG. 1 and FIG. 3 is a side cross-sectional view along the section lines 3-3' of FIG. 2, illustrating in more detail the structure of the trays in the shrimp bait container. FIG. 4 is a top view and FIG. 5 is a bottom view of the top most tray 10.

The top most tray 10 includes a substantially frusto-pyramidal shaped housing having four sides 11, 14, 17 and 20. Side 11 includes the inner surface 12 and the outer surface 13. Side 14 includes the inner surface 15 and the outer surface 16. Side 17 includes the inner surface 18 and the outer surface 19. And, side 20 includes the inner surface 21 and the outer surface 22. The housing includes the bottom 23. The sides and the bottom of the tray 10 are composed of a relatively thick, thermally insulating material such as a thermally insulating foamed plastic, for example styrofoam or foamed polyurethane. The sides 11, 14, 17 and 20 of the top tray 10 extend upwardly and outwardly from the bottom 23 and are inclined so that the outer surfaces 13, 16, 19, and 22 will mate with the respective inner surfaces 32, 35, 38 and 41 of the next lower tray 30, forming an enclosed volume 6 for storing the water medium 2.

The bottom 23 of the top tray 10 has a first perforation 24 therein as is shown in FIG. 2. A raised dam 25 is mounted at 26 to the bottom 23 of the tray 10 and has a second perforation 27 therethrough communicating with the first perforation 24 in the bottom 23. The dam 25 has a water-depth limiting upper surface 28 over which the water 1 within the enclosed volume 5 of the tray 10 may overflow through the first perforation 24 and the second perforation 27. The water may cascade through the perforations 27 and 24 into the enclosed volume 6 of the tray 30. New water may be introduced into the tray 10 and once its level within the pool 1 reaches the height of the upper surface 28 of the dam 25, the water will flow through the perforations 27 and 24 into the tray 30, thereby renewing the freshness of the water 2 in the tray 30. The shrimp bait contained in the water pool 1 in the tray 10 can be preserved alive in the thermally insulated environment of the tray 10. The height of the surface 28 of the dam 25 provides a limited depth for the water medium 1 therein so as to reduce the tendancy of the shrimp contained in the water medium 1 from grouping together and smothering one another.

Figure 8:
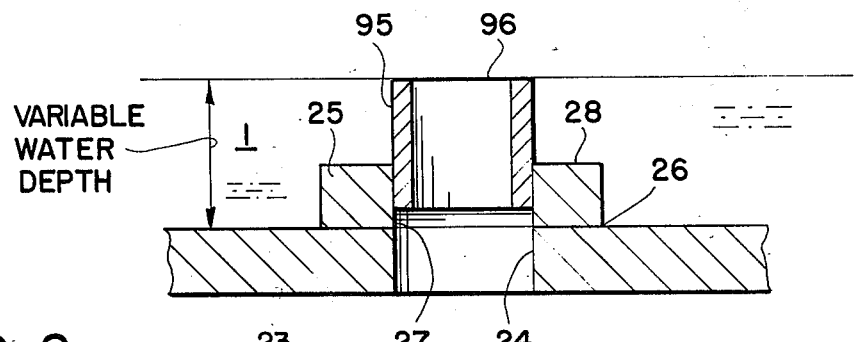
FIG. 8 is a detailed view of the adjustable pipe 95 for the top tray 10.

An adjustable water depth controlling pipe 95, which is shown in greater detail in FIG. 8, can be slideably mounted in substantial vertical orientation in the perforation 27 of the dam 25 and perforation 24 of the bottom 23 for the tray 10 to adjust the depth of the water 1. The pipe 95 has an upper entrance 98 which has a height above the bottom 23 of the tray 10, which can be selectively adjusted and through which the water 1 within the enclosed volume 5 may overflow, thus defining the depth of the water 1. In this manner, shrimp bait can be preserved alive by providing an adjustable depth for the water medium 1 so as to accommodate the particular species or size of shrimp which are segregated in the tray 10.

The dam 25 may be integrally formed as a boss on the bottom 23 of the tray 10 in a single molding operation. The tray 10 includes an upper lip 29 formed on the upper periphery of the sides 11, 14, 17 and 20. A lid 82, which is composed of a relatively thick, thermally insulating material, is shaped to fit on the upper lip 29 of the tray 10. The upper lip 29 has a first vertical fastening perforation 87 and a second vertical fastening perforation 88 through the lip 29, which are respectively juxtaposed with corresponding vertical fastening perforations 85 and 86 in the lid 82. A rope 83 passes through the perforations 85 and 87 and a rope 84 passes through the perforations 86 and 88 to enable fastening the lid to the upper most tray 10.

A second tray 30 is shown in top view in FIG. 6. The second tray 30 is identical to the first tray 10 except that the second tray 30 is turned end-for-end, as is shown in FIG. 2, so that the depth controlling pipe 95 for the tray 10 is not juxtaposed with the depth controlling pipe 97 of the tray 30. The depth controlling pipe 95 in the tray 10 is positioned on the bottom 23 so as to not be vertically juxtaposed with the depth controlling pipe 97 in the tray 30 so that refreshed water exiting from the pipe 95 of the tray 10 will mix in the pool 2 of water in the tray 30 and will not, instead, pass directly through the pipe 97.

The second tray 30 includes the first side 31 having the inner surface 32 and the outer surface 33, the second side 34 having the inner surface 35 and the outer surface 36, the third side 37 having the inner surface 38 and the outer surface 39, and the fourth side 40 having the inner surface 41 and the outer surface 42. These four sides and the bottom 43 are composed of a relatively thick, thermally insulating material. The sides 31, 34, 37 and 40 extend upwardly and outwardly from the bottom 43 and are inclined so that the outer surfaces 33, 36, 39 and 42 will mate with the respective inner surfaces 12', 15', 18' and 21' of the next lower tray 50, forming an enclosed volume 7 for storing the water medium 3.

The bottom 43 of the tray 30 has a first perforation therein. A raised dam 45 is mounted at 46 to the bottom 43 within the enclosed volume 6 and has a second perforation 47 therethrough which communicates with the first perforation in the bottom 43. The dam 45 has a water depth limiting upper surface 48 over which the water 2 within the enclosed volume 6 may overflow through the first and second perforations 47. The water may then cascade into the enclosed volume 7 of the next lower tray 50.

An adjustable water depth controlling pipe 97 may be mounted in substantial vertical orientation in the second perforation 47 and the first perforation in the bottom 43 of the tray 30. The pipe 97 has an upper entrance 98 having a height above the bottom 43 of the tray 30 which can be selectively adjusted and through which the water 2 within the enclosed volume 6 may overflow, thus defining the depth of the water 2. As was described above, the depth controlling pipe 97 in the tray 30 is positioned so as to not be juxtaposed with the depth controlling pipe 95 and the tray 10. The relative height of the entrance 98 for the pipe 97 in the tray 30 can be different from the relative height of the entrance 96 for the pipe 95 in tray 10, so as to accommodate different sized shrimp in the respective trays, requiring different depths of water medium in order to reduce the tendancy toward overcrowding, as was described above.

The tray 30 has an upper lip 49 through which there is the vertical perforation 89 which is juxtaposed with the perforation 87 of tray 10 and through which there is the perforation 90 which is juxtaposed with the perforation 88 of tray 10. The rope 83 passes through the perforation 89 and the rope 84 passes through the perforation 90.

The tray 50 shown in FIGS. 2 and 3 is identical in structure and orientation with the tray 10, and its various elements are numbered identically with those in tray 10, except for the addition of a prime to each respective reference numeral. It will be noted that in tray 50, the depth controlling pipe has been removed so as to illustrate the operation of dam 25' which serves as a depth limiting device for the water medium 3 therein.

The base tray 60 is shown in top view in FIG. 7 and includes a substantially frusto-pyramidal shaped base housing having four sides 61, 64, 67, and 70. Side 61 has the inner surface 62 which mates with the outer surface 13' of tray 50. Side 61 also has the outer surface 63. The side 64 has the inner surface 65 which mates with the outer surface 16' of the tray 50. Side 64 also has the outer surface 66. Side 67 has the inner surface 68 which mates with the outer surface 19' of the tray 50. Side 67 also has the outer surface 69. Side 70 has an inner surface 71 which mates with the outer surface 22' of the tray 50. Side 70 also has the outer surface 72. These four sides and the bottom 73 are composed of a relatively thick, thermally insulating material. The sides 61, 64, 67 and 70 extend upwardly and outwardly from the bottom 73 and are inclined so as to mate with the outer surfaces of the tray 50 as described, forming an enclosed volume 8 for storing the water medium 4. One of the sides 67 has a drain perforation 74 with a lower entrance edge 78 defining the depth of the water medium 4 in the enclosed volume 8 of the tray 60. In this manner, water introduced into the upper most tray 5 will cascade down through the next lower trays 30 and 50 and will drain out of the base tray 60 through the hole 74. The tray 60 further includes the dam 75 which is mounted at the joint 76 with the wall 67 on its inner surface 68, and which has the hole 77 therethrough, through which the pipe 80 is inserted. The pipe 80 passes through the dam 75 and its hole 77 and through the hole 74 of the wall 67. The lower edge 78 for the upper entrance of the pipe 80 forms the overflow point for the water medium 4 within the volume 8 of the tray 60. The pipe 80 enables drainage to take place from within the volume 8 of the tray 60. The pipe 80 may be adjusted inwardly or outwardly in the hole 74 of the wall 67, to provide an adjustable depth for the water 4. The tray 60 serves as the base for the stack of trays 10, 30, and 50.

The base tray 60 has an upper lip 79 which includes the vertical perforation 91 which is juxtaposed with the perforation 87 in tray 10 and further has the vertical perforation 82 which is juxtaposed with the perforation 88 in the tray 10. The rope 83 passes through the perforation 91 and the rope 84 passes through the perforation 92.

The rope 83 is terminated below the vertical perforation 91 in tray 60 by means of the knot 93. The rope 84 is terminated beneath the vertical perforation 92 in tray 60 by means of the knot 94. When the trays 10, 30, 50 and 60 are assembled with the lid 82 in its desired closed position, the ropes 83 and 84 may be drawn tight and tied together, thereby providing a secure mechanical linkage between the respective trays and the lid, for ease of portability.

The resulting shrimp bait container provides an improved means for preserving shrimp bait alive in a thermally insulating environment, in water medium having a depth which is adjusted to reduce the tendency of a particular species or size of shrimp from overcrowding. Furthermore, the resulting shrimp bait container provides a convenient means for refreshing the water medium by cascading new water through the plurality of stacked trays and provides a convenient means for segregating the shrimp bait by species and size.

Although a specific embodiment of the invention has been disclosed, it will be understood by those with skill in the art that changes can be made in the selection of structural details and materials disclosed without departing from the spirit and the scope of the invention. For example, the drain perforation 74 in the base tray 60 can be located in the bottom 73 thereof. Also, any of the vertical fastening perforations, for example, 87 and 88 of the top tray 10, can extend outwardly through the edge of the lip 29, so as to enable the rope 83 or 84 to disengage the lip by being moved outwardly.

What is claimed is:

1. A portable shrimp bait container, including a plurality of separable, stacked trays, each said tray, which stores shrimp bait in a water medium, comprising:

a substantially frusto-pyramidal shaped housing having four sides and a bottom composed of a relatively thick, thermally insulating material, said sides extending upwardly and outwardly from said bottom and inclined so that the outer surfaces thereof for an upper one of said plurality of trays will mate with the inner surfaces thereof for an adjacent lower one of said plurality of trays, forming an enclosed volume for storing said water medium, said bottom having a first perforation therethrough;

a raised dam mounted on said bottom of said housing within said enclosed volume, having a second perforation therethrough communicating with said first perforation in said bottom and having a water-depth limiting upper surface over which said water within said enclosed volume may overflow through said first and second perforations, and cascade into an enclosed volume formed within a next adjacent lower one of said plurality of trays;

an adjustable water-depth controlling pipe slideably mounted in substantially vertical orientation in said second perforation of said dam with an upper entrance having a height above said bottom of said housing which can be selectively adjusted and through which said water within said enclosed volume may overflow, defining the depth of said water;

said raised dam in each respective one of said plurality of trays being positioned on said bottom of its housing so as to not be vertically juxtaposed with the dam in the adjacent tray above or below said respective one tray;

said shrimp bait container further including a base tray comprising:

a substantially frusto-pyramidal shaped base housing having four sides and a bottom composed of a relatively thick, thermally insulating material, said sides thereof extending upwardly and outwardly from said bottom thereof and inclined so that the outer surfaces of said sides for a next adjacent one of said plurality of trays will mate with the inner surfaces of said sides of the base housing, forming an enclosed volume for storing said water medium, one of said sides of the base housing having a first drain perforation therethrough with a lower entrance edge defining the depth of said water medium in said enclosed volume of said base housing;

each of said plurality of trays and said base tray having an upper, outwardly extending lip formed on the upper periphery of its respective housing;

a lid composed of a relatively thick, thermally insulating material, shaped to fit on said upper lip of the housing of the uppermost one of said plurality of trays;

said lid and each said upper lip having at least one vertical fastening perforation therethrough, the perforation in said lid in each of said lips being vertically juxtaposed when said lid, said plurality of trays and said base tray are assembled in a stack;

a rope passing vertically through each of said fastening perforations for fastening the assembly together;

whereby said shrimp bait can be preserved alive in a thermally insulated environment having a limited depth for said water medium which can be conveniently refreshed by cascading through said plurality of stacked trays.

2. The shrimp bait container of claim 1, wherein said housing is composed of a thermally insulating foamed plastic.

3. The shrimp bait container of claim 1, wherein said dam is integrally formed as a boss on said bottom of said housing.

4. A shrimp bait container, including a plurality of stacked trays, each said tray, which stores shrimp bait in a water medium, comprising:

a substantially frusto-pyramidal shaped housing having four sides and a bottom composed of a relatively thick, thermally insulating material, said sides extending upwardly and outwardly from said bottom and inclined so that the outer surfaces thereof for an upper one of said plurality of trays will mate with the inner surfaces thereof for an adjacent lower one of said plurality of trays, forming an enclosed volume for storing said water medium, said bottom having a perforation therethrough;

an adjustable water-depth controlling pipe slideably mounted in substantial vertical orientation in said perforation in said bottom of said housing, with an upper entrance having a height above said bottom of said housing which can be selectively adjusted and through which said water within said enclosed volume may overflow, defining the depth of said water;

whereby said shrimp bait can be preserved alive in a thermally insulated environment having an adjustable depth for said water medium which can be conveniently refreshed by cascading through said plurality of stacked trays.

5. The shrimp bait container of claim 4, which further includes a base tray, comprising:

a substantially frusto-pyramidal shaped base housing having four sides and a bottom composed of a relatively thick, thermally insulating material, said sides thereof extending upwardly and outwardly from said bottom thereof and inclined so that the outer surfaces of said sides for a next adjacent upper one of said plurality of trays will mate with the inner surfaces of said sides of the base housing, forming an enclosed volume for storing said water medium, one of said sides of the base housing having a first drain perforation therethrough with a lower entrance edge defining the depth of said water medium in said enclosed volume of said base housing;

whereby water introduced into the upper most one of said plurality of trays will cascade down through each next lower one of said plurality of trays and drain out of said base tray.

6. The shrimp bait container of claim 4, wherein said housing is composed of a thermally insulating foamed plastic.

7. The shrimp bait container of claim 4, wherein said depth controlling pipe in each respective one of said plurality of trays is positioned on said bottom of its said housing so as to not be vertically juxtaposed with the depth controlling pipe in the adjacent tray above or below said respective one tray;

whereby refreshed water exiting from the adjacent tray above said respective one tray will mix with the water medium in said respective one tray and water exiting from said respective one tray will mix with the water in said adjacent tray below said respective one tray.

8. The shrimp bait container of claim 5, which further comprises:

each of said plurality of trays and said base tray having an upper, outwardly extending lip formed on the upper periphery of its respective housing;

a lid composed of a relatively thick, thermally insulating material, shaped to fit on said upper lip of the housing of the upper most one of said plurality of trays;

said lid and each said upper lip having at least one vertical fastening perforation therethrough, the perforations in said lid and in each of said upper lips being vertically juxtaposed when said lid, said plurality of trays and said base tray are assembled in a stack;

a rope passing vertically through each of said fastening perforations for fastening the assembly together.

9. The shrimp bait container of either claim 1 or claim 10, wherein said vertical fastening perforations through each said upper lip and said lid extends outwardly through the peripheral edge thereof, for enabling said rope to be selectively removed outwardly therefrom to disengage said respective lip or lid.

* * * * *